July 7, 1953　　　　K. A. KLINGLER　　　　2,644,663
ONE-PIECE CHECK VALVE OF MOLDED RESILIENT MATERIAL
Filed April 15, 1952
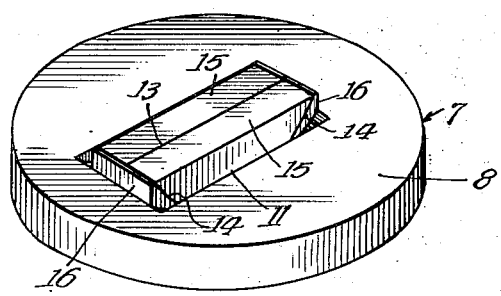
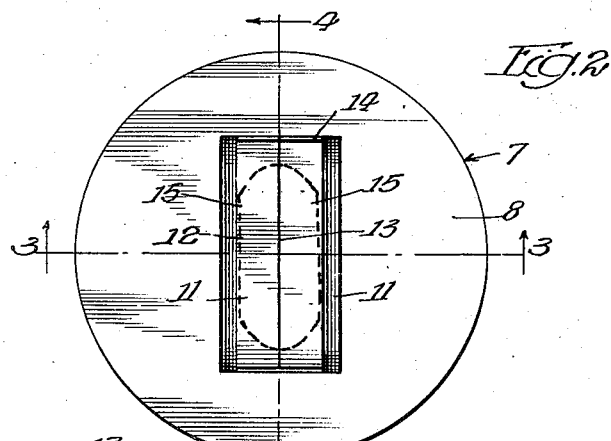
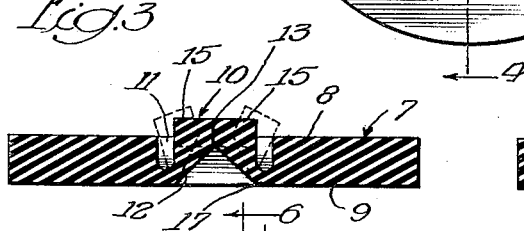
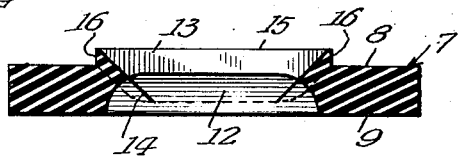
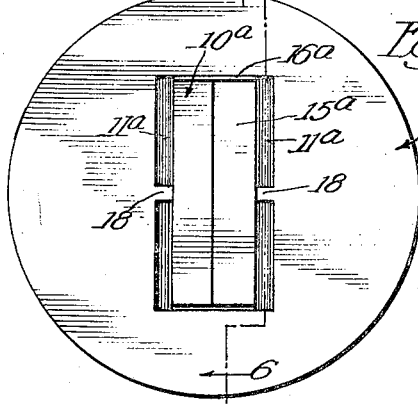
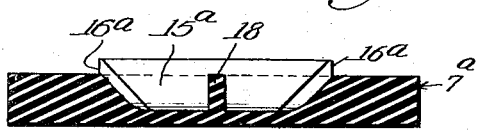
Inventor:
Karl A. Klingler Patented July 7, 1953

2,644,663

UNITED STATES PATENT OFFICE 2,644,663

ONE-PIECE CHECK VALVE OF MOLDED RESILIENT MATERIAL

Karl A. Klingler, Chicago, Ill., assignor to Roth Rubber Company, Chicago, Ill.

Application April 15, 1952, Serial No. 282,316

8 Claims. (Cl. 251—122)

The present invention relates generally to check valves. More particularly the invention relates to that type of check valve which is designed to be positioned in a passage through which fluid is adapted to flow, operates to permit the fluid to flow through the passage in one direction only and comprises a one-piece body which is shaped and adapted to extend across the passage, is formed of resilient material, such as molded rubber, and embodies on its central portion a pair of opposed coacting lips which are hinged to swing towards one another into a closed position wherein they are in abutting relation, and away from one another into an open position, and are so arranged that they automatically swing into their open position in response to flow of fluid in one direction through the passage and swing into their closed position when the fluid in the passage tends to back flow, i. e., flow in the opposite direction.

One object of the invention is to provide a check valve of this type which is an improvement upon, and has certain inherent advantages over, previously designed check valves and is characterized by simplicity of construction, high efficiency and low cost of manufacture.

Another object of the invention is to provide a check valve of the type under consideration in which the opposed coacting hinged lips are formed in such a novel manner that when in their open position they permit free and unobstructed flow of the fluid in one direction through the passage in which the valve is positioned and when in their closed position they form a highly effective seal whereby back flow of the fluid is positively prevented.

A further object of the invention is to provide a check valve which is generally of new and improved construction and effectively and efficiently fulfills its intended purpose.

Other objects of the invention and the various advantages and characteristics of the present check valve will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a check valve embodying one form of the invention;

Figure 2 is a plan view of the check valve of Figure 1;

Figure 3 is a transverse section taken on the line 3—3 of Figure 2 and illustrating in detail the cross sectional construction or design of the pair of opposed coacting lips;

Figure 4 is a transverse section at right angles to Figure 3 and taken on the line 4—4 of Figure 2;

Figure 5 is a plan view of a check valve embodying a second form of the invention; and Figure 6 is a transverse section on the line 6—6 of Figure 5.

The check valve which is shown in Figures 1 to 4, inclusive, constitutes one form or embodiment of the invention. It is designed to be positioned in a passage (not shown) through which fluid is adapted to flow and serves to permit the fluid to flow in one direction through the passage and to prevent back flow of fluid, i. e., flow of the fluid in the opposite direction through the passage. Generally speaking, the check valve is of one piece construction and consists of a body 7 of resilient material, such as molded, vulcanized rubber. The rubber of which the body is formed may be natural rubber or synthetic rubber, depending upon the type of fluid which is to be controlled by the check valve. The body 7 is shown in the drawing as being in the form of a disc and is materially less thick than it is wide. It has flat parallel side surfaces 8 and 9 and embodies on the central portion of its side surface 8 an integral rectangular enlargement 10. The outer surface of the enlargement is flat. It is positioned in parallel relation with the side surfaces 8 and 9 and is spaced from the side surface 8 a distance materially less than the thickness of the marginal portion of the body 7. The side and end surfaces of the enlargement 10 are flat and extend at true right angles to the outer surface. The body 7 is provided at the sides of the enlargement 10 with two parallel grooves 11. The latter are coextensive with the sides of the enlargement and extend inwards from the side surface 8 a distance approximately two-thirds of the distance between the side surfaces 8 and 9 of the body. The body has, in addition to the two parallel grooves 11 at the sides of the enlargement 10, a single elongated groove 12. The latter is in centered relation with the enlargement 10 but is of less width and length than the enlargement. It has rounded or curved ends as shown in Figure 4 and has V-shaped sides which converge in the direction of the enlargement 10. The enlargement has a longitudinal slit 13 midway between its sides and transverse slits 14 at its ends whereby it is divided or formed into a pair of opposed side by side longitudinally extending lips 15 and a pair of end parts 16 at the ends of the lips. The slit 13 has the ends thereof in intersecting relation with the central portions of the slits 14 and extends inwards from the outer surface of the enlargement to and through the inner apex portion of the groove 12. The transverse slits 14 at the ends of the enlargement extend throughout the full width of the enlargement 10. They also extend inwards from the outer end corners of the enlargement to and through the ends of the groove 12. As shown in Figure 4, the slits 14 extend at approximately 45° angles with respect to the side surface 9 of the body 7 and are inwardly convergent in the direction of said side surface. As the result of the angular arrangement of the slits 14 the ends of the lips 15 are undercut and are free with respect to the end parts 16. The latter, due to the angular arrangement of the slits 14, have inclined surfaces which are convergent in the direction of the side surface 9 and against which the undercut ends of the lips 15 abut when the lips are in their closed position wherein they abut against one another as shown in Figures 1 and 2. The portions of the body 7 of the check valve that are between the inner portions of the grooves 11 and the outer side portions of the groove 12 form hinges 17 whereby the lips 15 are permitted to swing apart into an open position as shown in dotted lines in Figure 3. Due to the manner in which the lips 15 are formed the lips normally assume their closed position wherein the inner side surfaces thereof are in abutting relation. The grooves 11 permit the lips to swing apart into their open position. The end members 16 of the enlargement are substantially immovable in that they do not flex or move when the lips 15 swing apart into their open position. When fluid is directed against the side surface 9 it first enters the groove 12 and causes the lips 15 to swing apart into their open position and then flows between the lips to the other side of the body. As soon as there is a cessation of flow of fluid against the side surface 9 the lips 15 return automatically to their closed position wherein, as previously indicated, the inner side surfaces thereof are in abutting relation and their undercut ends abut against or lap the adjacent inclined surfaces of the fixed end parts 16 of the enlargement. When the lips are in their closed position they prevent return flow of liquid, i. e., flow of liquid from the side of the body 7 having the side surface 8 to the side of the body having the side surface 9. In the event that the fluid on the side of the body with the side surface 8 tends to flow back or return the portion of the fluid that flows into the grooves 11 builds up such pressure against the side surfaces of the lips 15 as to cause the lips to swing into and remain in their closed position. When the lips 15 are in their open position the slits 13 and 14 open and form with the groove 12 an elongated opening through which the fluid passes.

The check valve which is shown in Figures 5 and 6 of the drawing constitutes another form or embodiment of the invention. It comprises a disc-like body 7a which is formed of molded, vulcanized rubber and has on the central portion of one side face thereof a rectangular enlargement 10a and grooves 11a along the sides of the enlargement. The enlargement 10a is slit lengthwise midway between its sides and also crosswise at its ends to form a pair of opposed hinged lips 15a and fixed end parts 16a at the ends of the lips. The check valve of Figures 5 and 6 functions in the same manner as the check valve of Figures 1 to 4, inclusive, and is the same in construction or design except that it includes narrow webs 18 which are disposed in and extend transversely across the central portions of the grooves 11a. The inner portions of the webs are joined to, and formed integrally with, the central portions of the side surfaces of the lips 15a and the outer portions of the webs are joined to, and formed integrally with, the portions of the body which define the central parts of the outer sides of the grooves 11a. The webs 18 serve yieldingly to hold the lips 15a in their closed position. When the lips 15a swing into their open position the webs become compressed.

The aforementioned check valves, due to the particular construction, design and arrangement of the lips thereof, effectively and efficiently fulfill their intended purpose and are capable of being produced at a comparatively low cost.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a check valve adapted to be positioned in a passage and to permit flow of fluid through the passage in one direction only, and comprising a body adapted to extend across the passage, formed of resilient rubbery material, having substantially flat side surfaces and an elongated fluid opening allowing communication between said side surfaces, embodying at the ends of the opening spaced apart inclined surfaces that are convergent in the direction of one side surface of the body, and provided along the sides of the opening with a pair of elongated opposed coacting lips, said lips having the ends thereof positioned adjacent the inclined surfaces and undercut at an angle corresponding to the angle of inclination of said inclined surfaces, having comparatively thin integral hinge connections between their outer side portions and the portions of the body along the sides of the opening whereby they are capable of swinging towards one another into a closed position wherein their inner side portions abut against one another and their undercut ends abut against the aforesaid inclined surfaces and away from one another into an open position wherein fluid is permitted to pass through said opening, and being so arranged that they swing into their open position when fluid is directed against said one side surface of the body and swing into their closed position when fluid is directed against the other side surface of the body.

2. As a new article of manufacture, a check valve adapted to be positioned in a passage and to permit flow of fluid through the passage in one direction only, and comprising a body adapted to extend transversely across the passage, formed of resilient rubbery material, having substantially flat side surfaces and an elongated fluid opening allowing communication between said side surfaces, and provided along the sides of the opening with a pair of elongated full length opposed coacting lips, said lips having comparatively thin integral hinge connections between their outer side portions and the portions of the body along the sides of the opening whereby they are capable of swinging towards one another into a closed position wherein their inner side portions abut against one another, and away from one another into an open position wherein fluid is permitted to pass through said opening, having the surfaces thereof that face towards one of the side surfaces of the body so angled that they converge in the direction of the other side when the lips are in their closed position, and being adapted to swing into their open position when fluid is directed against said one side surface of the body and swing into their closed position when fluid is directed against said other side surface of the body.

3. As a new article of manufacture, a check valve adapted to be positioned in a passage and to permit flow of fluid through the passage in one direction only, and comprising a one-piece body having materially less thickness than width, adapted to extend transversely across the passage, formed of resilient rubbery material, having substantially flat side surfaces and an elongated fluid opening allowing communication between said side surfaces, embodying at the ends of the opening spaced apart inclined surfaces that are convergent in the direction of one side surface of the body, and provided along the sides of the opening with a pair of elongated opposed coacting lips, said lips having the ends thereof positioned adjacent the inclined surfaces and undercut at an angle corresponding to the angle of inclination of said inclined surfaces, having comparatively thin integral hinge connections between their outer side portions and the portions of the body along the sides of the opening whereby they are capable of swinging towards one another into a closed position wherein their inner side portions abut against one another and their undercut ends abut against the aforesaid inclined surfaces and away from one another into an open position wherein fluid is permitted to pass through said opening, having the surfaces thereof that face towards said one side surface of the body so angled that they converge in the direction of the other side surface when the lips are in their closed position, and being adapted to swing into their open position when fluid is directed against said one side surface of the body and swing into their closed position when fluid is directed against the other side surface of the body.

4. As a new article of manufacture, a check valve adapted to be positioned in a passage and to permit flow of fluid through the passage in one direction only, and comprising a one-piece body having materially less thickness than width, adapted to extend across the passage, formed of resilient rubbery material, embodying substantially flat side surfaces, having in the central portion of one side surface a pair of spaced apart parallel coextensive comparatively long and deep grooves and in its other side surface a single comparatively deep groove in parallel relation with, and midway between, the pair of grooves, the portion of the body that is between said pair of grooves having a slit disposed in parallel relation with, and midway between, the pair of grooves and extending from said one side surface of the body to the inner portion of the single groove and also having slits which are located at the ends of, and are at right angles to, the first mentioned slit, intersect the ends of the pair of grooves and the ends of the single groove, and together with said first mentioned slit form said portion of the body that is between the pair of grooves into a pair of elongated opposed coacting lips, the portions of the body that are disposed between the inner portions of the pair of grooves and the sides of the single groove forming comparatively thin integral hinge connections whereby the lips are permitted to swing towards one another into a closed position wherein their inner side portions abut against one another and away from one another into an open position wherein fluid is permitted to pass between them, said lips being adapted to swing into their open position when fluid is directed against said other side surface of the body and to swing into their closed position when fluid is directed against said one side surface of the body.

5. As a new article of manufacture, a check valve adapted to be positioned in a passage and to permit flow of fluid through the passage in one direction only, and comprising a one-piece body having materially less thickness than width, adapted to extend across the passage, formed of resilient rubbery material, embodying substantially flat side surfaces, having in the central portion of one side surface a pair of spaced apart parallel coextensive comparatively long and deep grooves and in its other side surface a comparatively deep groove in parallel relation with, and midway between, the pair of grooves and with the ends thereof spaced inwards of the ends of said pair of grooves, the portion of the body that is between said pair of grooves having a slit disposed in parallel relation with, and midway between, the pair of grooves and extending through the body from said one side surface of the body to the inner portion of the single groove, and also having slits which are located at the ends of, and are at right angles to, the first mentioned slit, intersect the ends of the pair of grooves and the ends of the single groove, are so inclined that they are convergent in the direction of the other side surface, and together with said first mentioned slit form said portion of the body that is between the pair of grooves into a pair of elongated opposed coacting lips with undercut ends, the parts of the body at the ends of the lips having inclined surfaces in underlying relation with said undercut ends of the lips, the portions of the body that are disposed between the inner portions of the pair of grooves and the sides of the single groove forming comparatively thin integral hinge connections whereby the lips are permitted to swing towards one another into a closed posiiton wherein their inner side portions abut against one another and their undercut ends abut against the inclined surfaces of the aforesaid end parts and away from one another into an open position wherein fluid is permitted to pass between them, said lips being adapted to swing into their open position when fluid is directed against said other side surface of the body and to swing into their closed position when fluid is directed against said one side surface of the body.

6. As a new article of manufacture, a check valve adapted to be positioned in a passage and to permit flow of fluid through the passage in one direction only, and comprising a one-piece body having materially less thickness than width, adapted to extend across the passage, formed of resilient rubbery material, embodying substantially flat side surfaces, provided on the central portion of one side surface thereof with an integral rectangular enlargement, and having in said one side surface at the sides of the enlargement a pair of parallel coextensive comparatively deep grooves and in its other side surface a single comparatively deep groove in centered relation with, but of less width and length than, the enlargement, said enlargement being provided with a longitudinal full length slit which is disposed midway between its sides and extends from the outer surface of the enlargement to and through the inner portion of the single groove, and being also provided with transverse slits which are located at the ends of, and are at right angles to, the longitudinal slit, intersect the ends of the pair of grooves and the ends of the single groove are so inclined that they are convergent in the direction of said other side surface, and together with the longitudinal slit form the major portion of the enlargement into a pair of elongated opposed coacting lips with undercut ends, the end parts of said enlargement having inclined surfaces in underlying relation with said undercut ends of the lips, the portions of the body that are disposed between the inner portions of the pair of grooves and the sides of the single groove forming comparatively thin integral hinge connections whereby the lips are permitted to swing towards one another into a closed position wherein their inner side portions abut against one another and their undercut ends abut against the inclined surfaces of the aforesaid end parts of the enlargement and away from one another into an open position wherein fluid is permitted to pass between them, said lips being adapted to swing into their open position when fluid is directed against said other side surface of the body and to swing into their closed position when fluid is directed against said one side surface of the body.

7. As a new article of manufacture, a check valve adapted to be positioned in a passage and to permit flow of fluid through the passage in one direction only, and comprising a one-piece body having materially less thickness than width, adapted to extend across the passage, formed of resilient rubbery material, embodying substantially flat side surfaces, having in the central portion of one side surface a pair of spaced apart parallel coextensive comparatively long and deep grooves and in its other side surface a single comparatively deep groove in parallel relation with, and midway between, the pair of grooves, the portion of the body that is between said pair of grooves having a slit disposed in parallel relation with, and midway between, the pair of grooves and extending from said one side surface of the body to the inner portion of the single groove and also having slits which are located at the ends of, and are at right angles to, the first mentioned slit, intersect the ends of the pair of grooves and the ends of the single groove, and together with said first mentioned slit form said portion of the body that is between the pair of grooves into a pair of elongated opposed coacting lips, the portions of the body that are disposed between the inner portions of the pair of grooves and the sides of the single groove forming comparatively thin integral hinge connections whereby the lips are permitted to swing towards one another into a closed position wherein their inner side portions abut against one another and away from one another into an open position wherein fluid is permitted to pass between them, said lips being adapted to swing into their open position when fluid is directed against said other side surface of the body and to swing into their closed position when fluid is directed against said one side surface of the body, said body having integral webs in and extending transversely across the pair of grooves and serving yieldingly to urge the lips into their said closed position.

8. As a new article of manufacture, a check valve adapted to be positioned in a passage and to permit flow of fluid through the passage in one direction only, and comprising a one-piece body having materially less thickness than width, adapted to extend across the passage, formed of resilient rubbery material, embodying substantially flat side surfaces, provided on the central portion of one side surface thereof with an integral rectangular enlargement, and having in said one side surface at the sides of the enlargement a pair of parallel coextensive comparatively deep grooves and in its other side surface a single comparatively deep groove in centered relation with, but of less width and length than, the enlargement, said enlargement being provided with a longitudinal full length slit which is disposed midway between its sides and extends from the outer surface of the enlargement to and through the inner portion of the single groove, and being also provided with transverse slits which are located at the ends of, and are at right angles to, the longitudinal slit, intersect the ends of the pair of grooves and the ends of the single groove, are so called that they are convergent in the direction of said other side surface, and together with the longitudinal slit form the major portion of the enlargement into a pair of elongated opposed coacting lips with undercut ends, the end parts of the enlargement having inclined surfaces in underlying relation with said undercut ends of the lips, the portions of the body that are disposed between the inner portions of the pair of grooves and the sides of the single groove forming comparatively thin integral hinge connections whereby the lips are permitted to swing towards one another into a closed position wherein their inner side portions abut against one another and their undercut ends abut against the inclined surfaces of the aforesaid end parts of the enlargement and away from one another into an open position wherein fluid is permitted to pass between them, said lips being adapted to swing into their open position when fluid is directed against said other side surface of the body and to swing into their closed position when fluid is directed against said one side surface of the body, said body having integral webs in and extending transversely across the pair of grooves and serving yieldingly to urge the lips into their said closed position.

KARL A. KLINGLER.

References Cited in the file of this patent

UNITED STATES PATENTS

| Number | Name | Date |
| --- | --- | --- |
| 2,320,906 | Bent | June 1, 1943 |
| 2,328,830 | Maxon | Sept. 7, 1943 |
| 2,334,032 | Rhodes | Nov. 9, 1943 |